Patented Sept. 20, 1932

1,878,655

UNITED STATES PATENT OFFICE

GEORGE STAFFORD WHITBY, OF MONTREAL, QUEBEC, CANADA, ASSIGNOR TO THE ROESSLER & HASSLACHER CHEMICAL COMPANY, OF NEW YORK, N. Y., A CORPORATION OF DELAWARE

PROCESS OF AND COMPOUND FOR TREATING RUBBER

No Drawing. Application filed November 22, 1930, Serial No. 497,598, and in Great Britain July 18, 1930.

This invention relates to a new class of compounds or products and their use in the manufacture of rubber products of superior quality.

This application is a continuation in part of my pending application S. N. 383,176, filed August 2, 1929.

My new compounds are made by the reaction between a metal salt of a mercapto thiazole, or a substituted mercapto thiazole, and the addition product of a benzyl halide to hexamethylene tetramine. For example, I react an alkali metal salt of mercapto-benzo thiazole with hexamethylene tetramine benzyl chloride to obtain a new compound which I believe to be the hexamethylene tetramine benzyl ester of mercapto benzo thiazole.

One object of my invention is to accelerate the rate of vulcanization of rubber and sulphur mixtures, at the same time producing a vulcanized product having improved tensile strength and other desirable mechanical properties. This object is attained through the use of my new compounds, and particularly by the use of the reaction product of hexamethylene tetramine benzyl chloride with a salt of mercapto benzo thiazole, as described more fully below.

The hexamethylene-tetramine benzyl ester of mercapto benzo thiazole has the advantage of being a solid crystalline substance which can be readily and easily incorporated into a rubber mix. Furthermore, its melting point is sufficiently high so that it remains a solid, even in hot weather, and does not agglomerate or become sticky as do many other accelerators. Other properties of my accelerators which make them desirable are, that they can be used at both high and low temperatures; their acceleration of vulcanization is very rapid, they work well with carbon black stocks, so called non-blooming products can easily be made by their use, and they can be made at low cost.

The following example will serve to illustrate the process of making my improved accelerators;—an aqueous solution of 9.5 grams of the sodium salt of mercaptobenzo thiazole was mixed with an aqueous solution of 13.3 grams of the benzyl chloride addition product of hexamethylenetetramine. After stirring for some time, the turbid mixture became clear and 20 grams of a light yellow solid separated. This crude product was recrystallized from alcohol giving a pale yellow crystalline powder which melted at 140° C.

Other salts of mercapto benzothiazole may be used, with the benzyl chloride addition product, but I prefer the use of the relatively inexpensive and easily prepared sodium salt.

The product of this reaction has a definite melting point and I believe the reaction which takes place may be represented by the following equation:

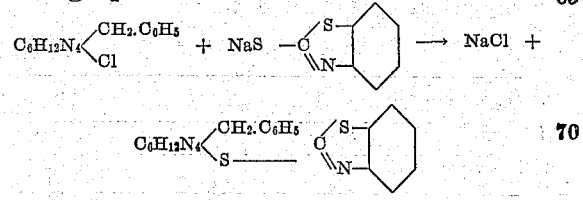

I therefore refer to this new product as the hexamethylenetetramine benzyl ester of mercapto benzothiazole; that is, hexamethylenetetramine benzyl mercapto benzothiazole.

The following examples illustrate the use of the product of the above reaction in the vulcanization of rubber:

Example I

| Ingredients | Parts |
|---|---|
| Rubber | 100 |
| Zinc oxide | 5 |
| Sulphur | 5 |
| Hexamethylenetetramine benzyl mercaptobenzo thiazole | ¾ |

After milling these ingredients together, the mix was vulcanized at a temperature corresponding to steam at 20 lbs. pressure. The resulting vulcanized product when tested gave the following results:

| Cure | Stretch | Set | 600 per cent elongation | Tensile |
|---|---|---|---|---|
| Minutes | | | | Pounds square inch |
| 20 | 810 | 20 | 1100 | 4009 |
| 40 | 760 | 22 | 1100 | 4436 |

Example II

This example illustrates the use of my accelerators in tire tread stock.

| Ingredients | Parts |
|---|---|
| Smoked sheet rubber | 100 |
| Carbon black | 35 |
| Zinc oxide | 5 |
| Sulphur | 3.5 |
| Stearic acid | 1.5 |
| Hexamethylenetetramine benzyl mercaptobenzo thiazole | 1 |

This mix was vulcanized at a temperature corresponding to 30 lbs. steam pressure. The resulting vulcanized product gave the following results when tested:

| Cure | Stretch (per cent) | 400 per cent elongation | Tensile |
|---|---|---|---|
| Minutes | | | Pounds per square inch |
| 20 | 630 | 1500 | 3160 |
| 30 | 620 | 1700 | 3434 |
| 40 | 610 | 1800 | 3488 |

The tabulation below further illustrates the use of my accelerators as applied to tire tread stocks and serves to show by way of example some of the numerous compounds embodied by my invention.

Formula used in tests

| | |
|---|---|
| Smoked sheet | 100.0 |
| Zinc oxide | 5.0 |
| Sulphur | 3.0 |
| Stearic acid | 1.5 |
| Accelerator | 1.0 |

These mixes were vulcanized for 30 minutes at 40 lbs. steam pressure with results when tested as given in the table:

Table

| Material | Melting point | Stretch | Load to produce 600 per cent elongation | Tensile strength (pounds) |
|---|---|---|---|---|
| | | Per cent | | |
| 1. Hexa benzyl 5 methyl mercapto benzothiazole. | Soft resin. | 740 | 1450 | 3848 |
| 2. Hexa benzyl 5 phenyl mercapto benzothiazole. | 71-2° | 760 | 1400 | 3905 |
| 3. Hexa benzyl 3 methyl mercapto benzothiazole. | 122-26° | 770 | 1250 | 3919 |
| 4. Hexa benzyl di mercapto benzothiazole. | Decomposed. | 900 | 600 | 3157 |
| 5. Hexa benzyl 4 and 6 methyl mercapto benzothiazole. | Resin 59-64° | 700 | 1400 | 2981 |
| 6. Hexa benzyl mercapto beta naptho thiazole. | 91-3° | 710 | 1800 | 3848 |
| 7. Hexa benzyl mercapto alpha naptho thiazole. | 92-95° | 760 | 1400 | 3878 |
| 8. Hexa benzyl 5 nitro mercapto benzo-thiazole. | 106-10° | 750 | 1300 | 3372 |
| 9. Hexa benzyl di methyl mercapto benzothiazole. | 62-110° | 740 | 1300 | 3768 |
| 10. Hexa benzyl 5 amino mercapto benzothiazole | 175-9° | 860 | 700 | 3313 |

My accelerators not only make possible the production in a very short curing time and at a low temperature, of vulcanized rubber of great toughness, tensile strength, and resistance to abrasion, when used alone, but tend to produce results of the same superior nature when used with other accelerators and rubber compounding ingredients. They produce better results and are more economical to use than hexamethylenetetramine or mercaptobenzothiazole.

The amount of my new accelerators necessary to be incorporated into the rubber to obtain the above described superior results will generally amount to less than 1% and more than ¼% of the weight of the rubber used. Less or greater amounts of accelerator than ¼ to 1% will, of course, give similar results, the exact amount for the best results depending upon the nature and amounts of the other ingredients of the mix to be vulcanized.

Claims:

1. The process for the preparation of the hexamethylene tetramine benzyl ester of a mercapto thiazole which comprises reacting the addition product of a benzyl halide and hexamethylene tetramine with a metal salt of a mercapto thiazole.

2. The process for the preparation of the hexamethylene tetramine benzyl ester of a substituted mercapto thiazole which comprises reacting the addition product of benzyl chloride and hexamethylene tetramine with the sodium salt of a substituted mercapto thiazole.

3. The process for the preparation of the hexamethylene tetramine ester of a mercapto thiazole comprising reacting the addition product of benzyl chloride and hexamethylene tetramine with a metal sale of an aryl mercapto thiazole.

4. The process for the preparation of the hexamethylene tetramine benzyl ester of a substituted mercapto thiazole which comprises reacting the addition product of benzyl chloride and hexamethylene tetramine with the sodium salt of a substituted aryl mercapto thiazole.

5. As a new composition of matter, the hexamethylene tetramine benzyl ester of a mercapto thiazole.

6. As a new composition of matter, the reaction product of hexamethylene tetramine benzyl chloride and a metal salt of a mercapto thiazole.

7. As a new composition of matter, the hexamethylene tetramine benzyl ester of an aryl mercapto thiazole.

8. As a new composition of matter, the reaction product of hexamethylene tetramine benzyl chloride and a metal salt of an aryl mercapto thiazole.

9. The process of preparing a rubber composition comprising incorporating with unvulcanized rubber a vulcanizing agent and the product resulting from reacting hexamethylene tetramine benzyl chloride with a metal salt of a mercapto thiazole, and, thereafter, vulcanizing.

10. The process of preparing a rubber composition comprising incorporating with unvulcanized rubber a vulcanizing agent and the product resulting from reacting hexamethylene tetramine benzyl chloride with a metal salt of an aryl mercapto thiazole, and, thereafter, vulcanizing.

11. The process of preparing a rubber composition comprising vulcanizing rubber in the presence of the hexamethylene tetramine benzyl ester of a mercapto naptho thiazole.

12. As a new composition of matter, the hexamethylene tetramine benzyl ester of a mercapto naptho thiazole.

13. As a new composition of matter, the reaction product of hexamethylene tetramine benzyl chloride and a metal salt of a mercapto naphtho thiazole.

14. A rubber composition resulting from the vulcanization of a rubber mix comprising a product as set forth in claim 5.

15. A rubber composition resulting from the vulcanization of a rubber mix comprising a product as set forth in claim 6.

16. A rubber composition resulting from the vulcanization of a rubber mix comprising the product obtained when hexamethylenetetramine benzyl halide is reacted with the metal salt of a mercaptothiazole.

17. A rubber composition resulting from the vulcanization of a rubber mix comprising the product obtained when hexamethylenetetramine benzyl chloride is reacted with the sodium salt of a mercapto naptho thiazole.

Signed at Toronto, Canada, this 18th day of November A. D. 1930.

GEORGE STAFFORD WHITBY.

CERTIFICATE OF CORRECTION.

Patent No. 1,878,655. September 20, 1932.

GEORGE STAFFORD WHITBY.

It is hereby certified that error appears in the printed specification of the above numbered patent requiring correction as follows: Page 2, line 103, claim 3, for "chloride" read halide; and that the said Letters Patent should be read with this correction therein that the same may conform to the record of the case in the Patent Office.

Signed and sealed this 29th day of November A. D. 1932.

(Seal)

M. J. Moore,
Acting Commissioner of Patents.